Figure 1:
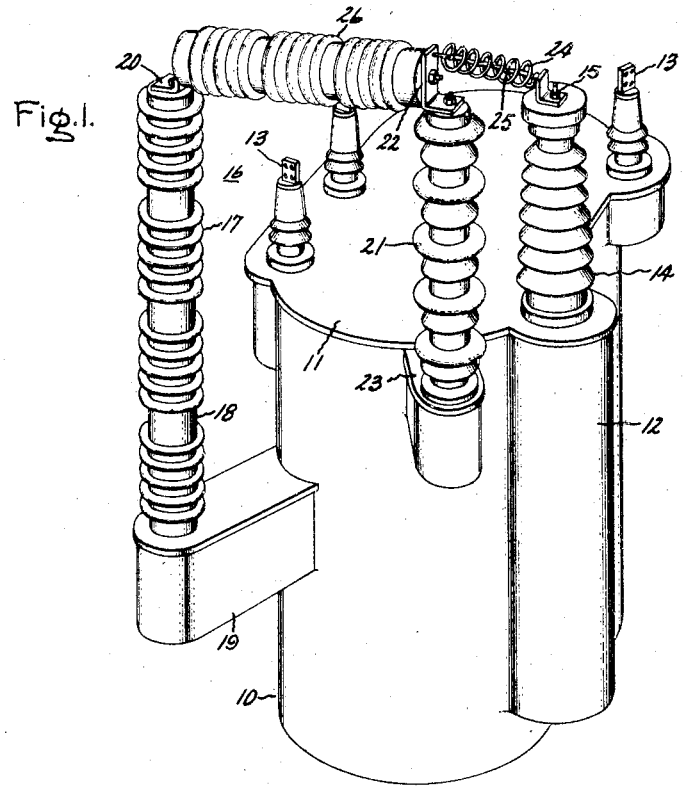

Inventor:
Konstantin K. Paluev,
by Harry E. Dunham
His Attorney.

Inventor:
Konstantin K. Paluev,
by Harry E. Dunham
His Attorney.

Patented June 3, 1947

2,421,644

UNITED STATES PATENT OFFICE 2,421,644

TANK MOUNTED LIGHTNING ARRESTER

Konstantin K. Paluev, Pittsfield, Mass., assignor to General Electric Company, a corporation of New York Application January 5, 1945, Serial No. 571,521

5 Claims. (Cl. 175—30)

My invention relates to an electric apparatus having a bushing and a lightning arrester and more particularly to arranging the bushing and lightning arrester in such relationship as substantially to control the voltage distribution along the lightning arrester.

This is a continuation-in-part of my application, Serial No. 443,311, filed May 16, 1942, and assigned to the assignee of this application.

Electric apparatus, and particularly high voltage stationary electromagnetic apparatus, such as transformers, are usually provided with a bushing having a stud which is adapted to be connected to an electrical line, and with a lightning arrester for protecting the winding structure from injury upon a high voltage surge of short duration striking the apparatus. One end of the lightning arrester is usually connected to the high voltage bushing and the voltage will normally tend to pile up at the line end of the lightning arrester so that a relatively steep voltage gradient will exist at that end of the arrester. In order to distribute the voltage more evenly it is customary to use separate shields or rings of a generally conical shape around the line end of the arrester so as to distribute more evenly the voltage gradient along the lightning arrester.

In accordance with this invention separate shields or rings for controlling the voltage stress distribution in the lightning arrester are entirely dispensed with and the lightning arrester, particularly the high voltage end of the lightning arrester, is so oriented with respect to the high voltage bushing that the capacitance therebetween substantially compensates for the effect of the capacitance to ground of the lightning arrester with the result that the voltage stress distribution in the lightning arrester is substantially uniform. By eliminating the customary separate shields or rings around the high voltage end of the lightning arrester the spacing between the high voltage end of the arrester and grounded parts of the apparatus may be reduced because heretofore the minimum spacing was determined by the arc-over distance between the shields or rings and the grounded parts.

It is therefore an object of my invention to provide an improved arrangement for controlling the voltage distribution of a lightning arrester.

Another object of my invention is to provide an improved lightning arrester arrangement which reduces to a minimum space occupied by the arrester structure above the electric apparatus with which the arrester is employed.

Further objects and advantages of my invention will become apparent from the following description referring to the accompanying drawing, and the features of novelty which characterize my invention will be pointed out with particularity in the claims annexed to and forming a part of this specification.

Figure 2:
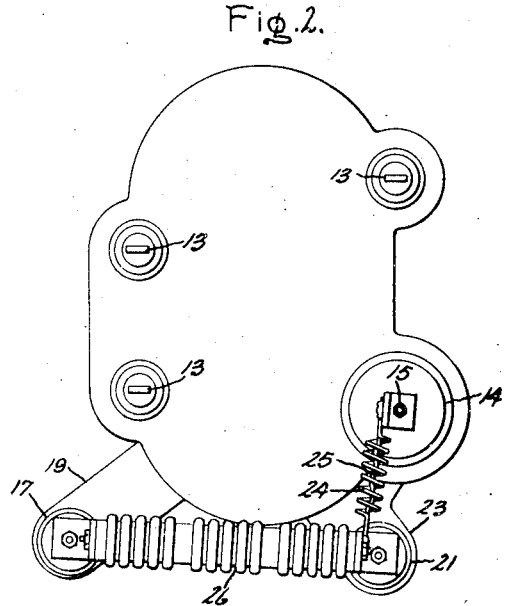
Figure 3:
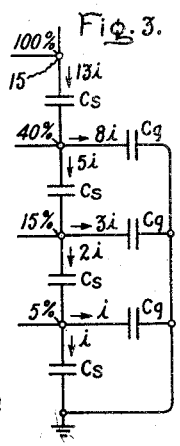
Figure 4:
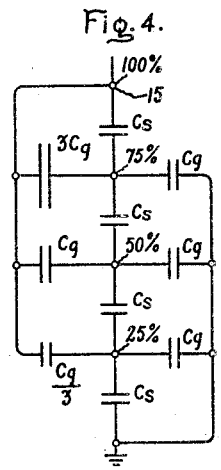
Figure 5:
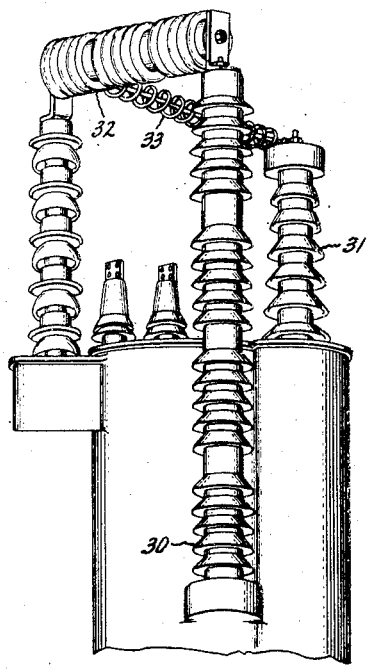
Figure 6:
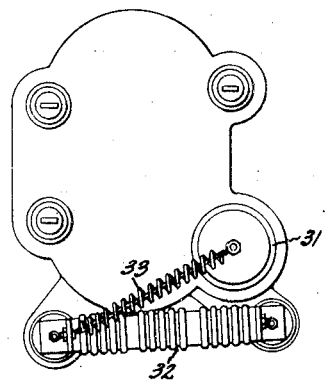
Figure 7:
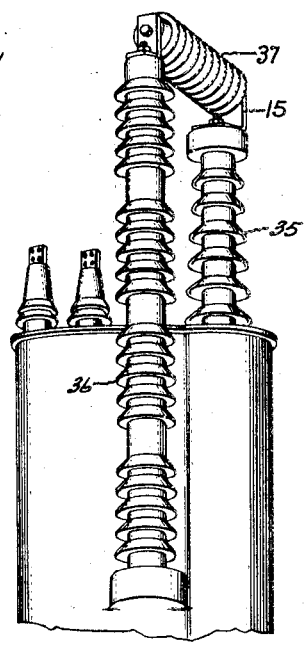

In the drawing Fig. 1 is a perspective view of a high voltage transformer which is provided with an embodiment of my invention, Fig. 2 is a top view of the apparatus illustrated in Fig. 1, Fig. 3 is an equivalent circuit diagram which illustrates the electrostatic relation in a conventional lightning arrester, Fig. 4 illustrates how my invention modifies Fig. 3, Fig. 5 is a perspective view of a transformer illustrating a modification of the structure illustrated in Figs. 1 and 2, Fig. 6 is a top view of the apparatus illustrated in Fig. 1, and Fig. 7 is a perspective view of a transformer illustrating another modification of my invention.

In the arrangements illustrated in the drawing my invention has been shown as applied to a relatively high voltage transformer including a normally grounded metallic casing 10 having a cover 11 and side walls 12. Upon the cover are mounted a plurality of low voltage bushings 13 and a high voltage bushing 14 which has a stud 15 adapted to be connected to any suitable electric apparatus or electrical line. In order to provide a path for high voltage surges of short duration a lightning arrester structure 16 is provided which includes a plurality of units 17 serially connected together.

When employing an arrester with a relatively high voltage apparatus, a large number of units 17 are usually employed superimposed one on top of the other to obtain the proper protection. In order to minimize the space above the transformer cover which will be occupied by such an extended lightning arrester structure it has been customary to mount the lightning arrester structure on the side of the transformer unit, taking care that the lower end of the lightning arrester will be sufficiently above the bottom of the casing so as to prevent grounding of the lower lightning arrester unit or the touching of the lightning arrester unit by some unauthorized person. Thus, in the structure illustrated in Figs. 1 and 2, a section 18 including a plurality of units 17 is mounted on a bracket member 19 which extends from the side wall of the casing. The section 18 of the lightning arrester structure will, therefore, extend in a vertical direction. In order, however, to minimize the space above the cover which will be occupied by the lightning arrester structure, I provide the lightning arrester with a second section 26 which is perpendicular with the section 18. The adjacent ends are electrically connected together and one end of the section 26 is mounted on the section 18 through a connector member 20. In order to support the opposite end of the lightning arrester section 26 an insulating arrangement 21 is provided having a bracket member 22 for supporting the end of the section 26 which extends away from the lightning arrester section 18. The insulating arrangement 21 may be mounted in any suitable manner and in the arrangement illustrated in the drawing it is mounted by a bracket member 23 which extends from the side wall 12 and which is spaced from the bracket member 19.

In order to control the electrostatic voltage distribution of the lightning arrester structure the section 18 is spaced relatively far from the bushing 14 so that the right angularly extending portion 26 may extend toward the bushing 14. The end of the lightning arrester section 26 which is supported by the insulating member 21 and the stud 15 are electrically connected together through an electrical conductor 24. This may be of any suitable construction, and as shown in Fig. 1 includes a flexible portion 25 so that any jars in one of the members will not be transferred to the other. It has been found that the proximity effect of the bushing construction 14 and the lightning arrester section 26 together with the capacitive effect of the conductor 24 will so modify the normal electrostatic voltage distribution of the arrester as to provide a substantially uniform voltage gradient along the lightning arrester. Thus, mounting the lightning arrester structure with sections perpendicular to each other not only reduces to a minimum the space above the transformer cover which is needed to accommodate the lightning arrester structure but also contributes to the distribution of the voltage gradient. It will be understood that by varying the relative positions of the two sections of the lightning arrester and the bushing 14 the capacities between these members will be varied so that the proper or desirable electrostatic voltage distribution may be provided.

The operation of my invention will be explained more fully in connection with Figs. 3 and 4. Fig. 3 illustrates diagrammatically the electrostatic or capacitance relations in the lightning arrester 16. It will be understood, of course, that the serially-connected units of the lightning arrester are not the full equivalent of capacitors because they are high resistance devices but are not, strictly speaking, devices having dielectrics in the sense that capacitors have. However, they do have conducting elements which are separated by high resistance elements under normal voltage conditions so that neglecting the normally small leakage current which flows through the high resistance they do constitute elemental capacitors. These elemental capacitors are shown, for example, as being four in number which are connected in series between ground and the high voltage stud 15. The lightning arrester also has capacitance to ground by reason of its proximity to the grounded casing of the apparatus and this is illustrated in the diagram by the three capacitors which are connected between the junction points of the series capacitors and ground. For present purposes it will be assumed that all of the unit capacitances are equal and this condition can always be obtained by selecting the connection points at such places that the capacitances will be equal. The two lowermost capacitors in Fig. 3 are shown connected in parallel so that they must have the same voltage, and consequently they must have the same current. Assuming that this current has a value of $i$, then the next uppermost one of the serially-connected group of capacitors will carry the sum of these currents or a current equal to $2i$. Consequently, the sum of the voltages across the two lowermost serially-connected capacitors is three times the voltage across the lowest of the serially-connected capacitors so that the voltage across the middle capacitor element to ground is three times the voltage across the two lowermost capacitors so that it will carry a current equal to $3i$. The $2i$ and $3i$ currents must both flow through the next to the uppermost of the serially-connected capacitors so that this carries a current equal to $5i$ with the result that the voltage between the junction point of the two uppermost serially-connected capacitors is eight times the voltage across the lowermost of the serially-connected capacitors so that the uppermost of the unit capacitors to ground carries a current of $8i$. Consequently, the uppermost of the serially-connected capacitors carries a current equal to $13i$. The result is that the voltage stress distribution along the serially-connected capacitors constituting the lightning arrester is far from uniform. For example, if the voltage to ground of the high voltage stud or terminal 15 is 100 per cent, then the voltage between the two uppermost serially-connected capacitors is approximately 40 per cent, the voltage of the junction point between the two middle capacitors is approximately 15 per cent, and the voltage between the lowermost capacitors is approximately 5 per cent.

It will thus be seen that the voltage stress distribution in the lightning arrester is influenced by its shunt capacitance to ground. It has been found that a measure of the maximum departure of the voltage stress distribution from a linear or uniform voltage stress distribution is proportional to $$\sqrt{\frac{\Sigma C_g}{\Sigma C_s}}$$

where $\Sigma C_g$ is the total shunt capacitance to ground and $\Sigma C_s$ is the total series capacitance to ground.

In Fig. 4 three capacitors have been interposed between the line terminal or stud 15 and the lightning arrester which is represented by the four serially-connected unit capacitors $C_s$. It will be seen that each of these three different size capacitors is serially connected with a different one of the three shunt capacitors $C_g$ to ground of the lightning arrester between the high voltage line terminal and ground. If now the network comprising the six $C_g$ capacitors is considered as unconnected with the four $C_s$ capacitors which represent the series capacitance to ground of the lightning arrester, then the voltage of the junction of the $3C_g$ and $C_g$ elements will be 75 per cent of the line voltage, the voltage of the junction of the two equal serially-connected $C_g$ elements will be 50 per cent of the line voltage, and the voltage of the junction $$\frac{C_g}{3}$$

and $C_g$ elements will be 25 per cent of the line voltage. These are the respective voltages which the junctions of the first and second, second and third, and third and fourth $C_s$ capacitors should have for uniform voltage distribution and are what they would have if the lightning arrester had no shunt capacitance to ground. Therefore, by interconnecting the above-mentioned junctions of $C_g$ and $C_s$ networks, as shown in Fig. 4, the voltage stress distribution in the lightning arrester becomes linear or uniform.

By reason of the physical relationship between the high voltage bushing 14, the connecting lead 24—25 and the high voltage section 26 of the lightning arrester it will be seen that the physical spacing between the bushing and the connector on the one hand and the high voltage section of the lightning arrester 26 on the other hand progressively decreases from the high voltage terminal of the lightning arrester. Consequently, the capacitance between the high voltage line terminal equipment and the lightning arrester is a maximum at the high voltage end and it progressively decreases as the voltage of the lightning arrester elements decreases. Consequently, the capacitance between the high voltage terminal equipment and the high voltage section 26 of the lightning arrester may be made to approximate the tapered relationship indicated diagrammatically by the three capacitors $3C_g$, $C_g$ and $$\frac{C_g}{3}$$

The purpose of the spiral conductor portion 24 of the connection between the high voltage stud 15 and the high voltage terminal of the lightning arrester is for the purpose of increasing the effective diameter or surface of the conductor so as to increase the capacitance between this conductor and the lightning arrester. The straight connection 25 being in shunt with the spiral conductor 24 serves to short circuit or bypass any inductive effective of the spiral 24.

In Figs. 5 and 6 I have illustrated a lightning arrester and bushing construction in which a lightning arrester section 30 is mounted parallel with a bushing 31 and a lightning arrester section 32 which is perpendicular to the section 30 and which extends away from the bushing 31 in such a relationship that when a conductor 33 connects the outer end of the the section 32 and the bushing 31, the conductor 33 and section 32 provide an acute angle, whereas the corresponding angle in Figs. 1 and 2 is obtuse. Due to the proximity effect of the section 32, the conductor 33, and the bushing 31 a suitable electrostatic voltage distribution may be had.

In Fig. 7 I have illustrated a construction including a bushing 35 and a lightning arrester structure 36. The lightning arrester 36 is provided with a horizontal section 37, one end of which is directly connected to the high voltage stud 15 of the bushing 35 and which end is entirely supported by the bushing 35. In this construction the electrical connector 24—25 of Figs. 1 and 2 and 33 of Figs. 5 and 6 is eliminated and the proper capacitance between the high voltage line terminal equipment and the high voltage end of the lightning arrester is obtained by the orientation of the high voltage section 37 of the lightning arrester with respect to the bushing 35.

It will be understood that in Figs. 1 and 5 it will not always be essential to have a special connector having an enlarged surface, and that in such cases a straight conductor may be used. The only purpose of increasing the effective surface of the conductor by the spiral conductor shown in these figures is in order to supplement the proximity effect of the high voltage end of the lightning arrester to the high voltage bushing when that is necessary.

Although I have shown and described particular embodiments of my invention, I do not desire to be limited to the particular embodiments described, and I intend in the appended claims to cover all modifications which do not depart from the spirit and scope of of my invention.

What I claim as new and desire to secure by Letters Patent of the United States is:

1. An electric apparatus including a normally grounded metallic casing, a bushing mounted on the top of said casing, said bushing having a stud adapted to be connected to an electrical line, a lightning arrester including a plurality of units providing one section disposed parallel with and spaced from said bushing and a second section perpendicular to said first section, and an electrical conductor connecting said stud with said second section of said arrester, said bushing, lightning arrester and electrical conductor being so proportioned and positioned with respect to each other that the capacity therebetween combines with the shunt capacitance to ground of said arrester so as to provide a uniform normal potential distribution on the units of said arrester.

2. An electric apparatus including a metallic casing, a bushing mounted on said casing, said bushing having a stud adapted to be connected to an electrical line, insulating means spaced from and disposed substantially parallel with said bushing, a lightning arrester including one section disposed parallel and spaced from said bushing and said insulating means and a second section supported at one end by said first section and at the other end by said insulating means, and an electrical conductor for connecting said stud with said end of said arrester supported by said insulating means, said conductor and said second section of the lightning arrester making an obtuse angle with each other.

3. An electric apparatus including a casing having a top and a side, a bushing mounted on said top, said bushing having a stud adapted to be connected to an electrical line, a pair of spaced brackets extending from said side of said casing, insulating means mounted on one of said brackets and disposed substantially parallel with said bushing, a lightning arrester having a first and a second section, said first section being mounted on said other bracket and said second section being supported by said first section and said insulating means, and a conductor for connecting said second section with said stud, said conductor having an abnormally large effective surface for increasing the capacitive effect between itself and the second section of said lightning arrester.

4. An electric apparatus including a metallic casing, a bushing mounted on said casing, said bushing having a stud adapted to be connected to an electrical line, a lightning arrester including a pair of sections, one of said sections being disposed substantially parallel with and spaced from said bushing, said second section being substantially perpendicular with said first section and having an end spaced from said first section, and an electrical conductor connecting said stud with said end of said second section, said second section and said conductor forming an acute angle so that the proximity effect of conductor and said bushing with said second section will modify the capacity between the arrester and ground and provide a substantially uniform electrostatic voltage gradient on said arrester.

5. In combination, high voltage electrical apparatus having a grounded metallic casing, a high voltage bushing mounted on said casing, a stud on said bushing for making connection to a high voltage line, and a lightning arrester having two sections each comprising a plurality of serially-connected units arranged in a straight line, said sections being directly connected in series and disposed at an angle substantially less than 180 degrees with each other, one end of one section being directly connected to said stud and physically supported by said bushing.

KONSTANTIN K. PALUEV.

REFERENCES CITED

The following references are of record in the file of this patent:

UNITED STATES PATENTS

| Number | Name | Date |
|---|---|---|
| 1,783,052 | Peek | Nov. 25, 1930 |

OTHER REFERENCES

"Crystal Valve Lightning Arresters," catalog #390 of the Electric-Service Supplies Co., 1937, pp. 24, 25, 36 and 37.